April 1, 1941.                J. T. TYKOCINER ET AL                2,237,242
                                   PHOTOTUBE
                           Original Filed Jan. 5, 1938

Inventors:
Joseph Tykocinski Tykociner
Jakob Kunz Dec'd, By Anna Kunz, Ex'trix.
Lloyd Preston Garner
Benton Baker
                Atty.

Witness:
Arni Arnason

Patented Apr. 1, 1941

2,237,242

UNITED STATES PATENT OFFICE 2,237,242

PHOTOTUBE

Joseph Tykocinski Tykociner and Lloyd Preston Garner, Urbana, Ill., and Jakob Kunz, deceased, late of Urbana, Ill., by Anna Kunz, executrix, Urbana, Ill., assignors to Board of Trustees of the University of Illinois, Urbana, Ill.

Original application January 5, 1938, Serial No. 183,460. Divided and this application September 13, 1939, Serial No. 294,652

8 Claims. (Cl. 250—165)

The object of the invention is to provide a phototube of greater sensitivity and stability than has heretofore been possible, with substantial uniformity of product. This is accomplished by subjecting the alkali metal forming the photo-sensitive surface of the cathode of such a tube to what we term bombardment with hydrogen, or other suitable gas, which has been highly activated and to a substantial extent dissociated, and with electrons. We have secured an increase of sensitivity by our method exceeding fifty times that previously obtainable.

This is a division of application Serial No. 183,460 filed January 5, 1938, upon which Letters Patent No. 2,185,531, issued on January 2, 1940.

In the drawing—

Figure 1:
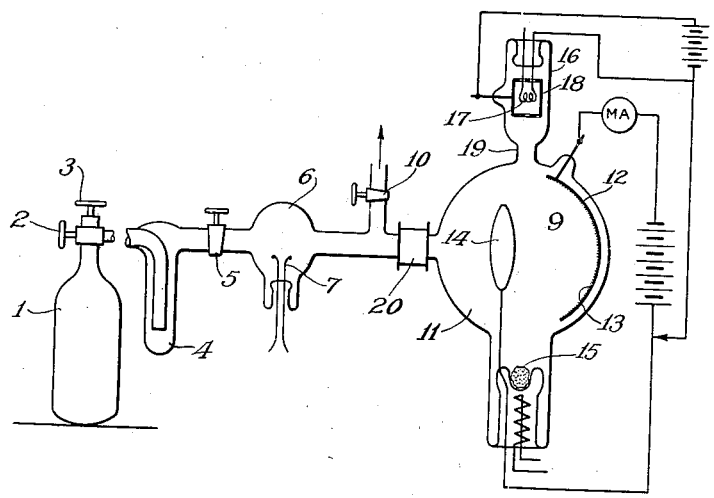
Fig. 1 is a schematic drawing of one arrangement of apparatus which may be used in carrying out the several steps of the method of our invention.

Referring to Fig. 1, in carrying out our invention with one arrangement of apparatus we employ a source of molecular hydrogen, container 1, which may be a steel tank, equipped with a pressure reduction valve 2 and a supply valve 3. This container is charged with molecular or diatomic hydrogen known as $H_2$, which is commercially available, or may be obtained from an electrolytic decomposing cell, or other suitable source. Valve 2 is adjustable so that hydrogen can be discharged at a suitable pressure, which may be of the order of 0.1 atmosphere to 1 atmosphere, depending on the pressure in other parts of the system.

Suitably connected with container 1 through valves 2 and 3 is water trap 4 for control of the humidity or water content of the hydrogen. The temperature of water trap 4 is adjustable so that substantially all water, or as much as may be desired can be removed from the hydrogen. If desired, the water trap may be supplemented by a palladium thimble or other suitable means for obtaining substantially pure hydrogen or for obtaining hydrogen of definite water content.

Figure 2:
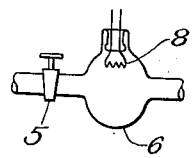
Fig. 2 is a schematic drawing showing an activating and dissociating chamber equipped with filament instead of electrodes.
Figure 3:
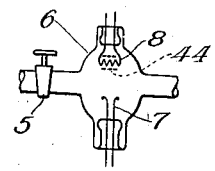
Fig. 3 is a schematic drawing showing an activating and dissociating chamber equipped with both electrodes and filament.

Connected with water trap 4, through pressure valve 5 preferably adapted to precise adjustment for controlling the flow of gas, is activating and dissociating chamber 6, which may be of any suitable size or shape, depending on the desired capacity of the system. This chamber is equipped with activating and dissociating means, which may consist of a pair of electrodes 7, as shown in Fig. 1, at suitable potentials, a heated filament 8, as shown in Fig. 2, a combination of these, as shown in Fig. 3, or other electrical means for heating or ionizing. Or the chamber may be excited electrodelessly by high frequency currents. Or the chamber may be made of quartz or other suitable material and, a trace of mercury being preferably added to the $H_2$, subjected to ultra-violet light.

To chamber 6 is connected the phototube 9, which is to be sensitized. So that the system may be evacuated and the pressure therein further controlled, a side valve 10 is interposed between chamber 6 and tube 9, and connected with a vacuum pump.

The various connections may be of conventional form.

The phototube may be of the type described in Letters Patent of the United States No. 1,381,474 to Jakob Kunz of June 14, 1921, or other conventional type. The form shown in Fig. 1 consists of a glass envelope or bulb 11, otherwise evacuated but containing a cathode 12 having a surface 13 of alkali metal, for example, lithium, sodium, potassium, rubidium, or caesium; an anode 14 of non-corrosive metal, for example, nickel, silver, or platinum; and a residuum of alkali metal 15 from which the cathode was formed. But we may employ a tube having multiple photosensitive electrodes or any form or arrangement of photosensitive alkali metal surfaces which lose electrons under the influence of radiation.

To sensitize the tube 9, the system having been first evacuated through valve 10, and that valve closed, the valve 3 is opened and the valve 2 adjusted so that the contents of container 1 will be discharged into the system at the desired pressure, which normally does not exceed 0.1 atmosphere, the valve 5 being open and adjusted accordingly. As the hydrogen passes through water trap 4, its moisture content is reduced to approximately zero, or other desired extent. It then passes into chamber 6 and the remainder of the system, including the tube 9, until a pressure of about 0.5 mm. Hg is reached, when valve 5 is closed.

A velocity selector of known type may be interposed at or near the point of admission of the activated and dissociated gas to the tube as indicated at 20 in Fig. 1, for the purpose of regulating the movement of such gas into the tube.

A suitable potential is then applied to the electrodes 7. For example, using hydrogen having a humidity of 0.1%, at room temperature, the electrodes being spherical and of a diameter of 5 mm. and spaced 5 mm. apart, and at the pressure indicated, a potential of about 750 volts applied for about five seconds usually produces a satisfactory result. We have secured our best results with the presence about the electrodes of atomic hydrogen indicated, during the application of potential to the electrodes, by a substantial predominance of the Balmer lines appearing in the spectroscope.

The sensitivity of the tube is then tested in the conventional manner and ordinarily will be found to have been substantially increased. If the desired sensitivity has not been attained, the system may be again evacuated through valve 10 and the operation repeated.

Sufficient sensitivity of the tube having been attained in the manner described, we then subject the tube to additional treatment which further sensitizes and stabilizes it, in the following manner: An electronic gun 16 of the form used in cathode ray oscillograph tubes, including incandescent filament 17 and anode cylinder 18, as shown diagrammatically in Fig. 1, or other suitable source of electronic discharge, equipped with electron optical elements for uniformly distributing electrons over the photosensitive surface, is connected to the tube as at 19. The tube is then preferably evacuated. Thermions emitted by the filament 17 are accelerated by the anode cylinder 18 and impinge upon the alkali surface 13 of the cathode 12. The rate of electronic discharge may be of the order of 0.01 to 5 ma. per square centimeter of the area of the alkali surface of the cathode 12 for from one second to ten minutes, depending on the potential which may be from 20 to 400 volts. The sensitivity of the tube is then tested at intervals of a few minutes and if the desired sensitivity has not been attained and retained, the operation is repeated. When an optimum result has been reached, the connections are removed, the tube evacuated, or filled with suitable gas, and sealed.

It will be understood that what we have referred to as cathode 12 serves as an anode during the period of electronic treatment.

It will also be understood that our method is equally applicable to the restoration of a phototube which has lost its sensitivity.

We have found that the bombardment of a photosensitive alkali metal surface with activated and dissociated hydrogen may be carried beyond a point of maximum sensitivity with resulting loss of sensitivity, and that in such case bombardment with electrons not only restores the lost sensitivity but produces greater sensitivity than previously had been attained.

We have indicated the use of substantially dry hydrogen and hydrogen of varying water content. When substantially all water vapor has been removed from the hydrogen prior to its introduction into chamber 6, we prefer to use a filament instead of electrodes in this chamber. In such case as shown in Fig. 2, a tungsten filament 8 is preferably used and heated by suitable electric current to a temperature of about 2600° K. for a period of about one to five minutes. In other respects the procedure is the same as when electrodes are employed in chamber 6.

Instead of molecular or diatomic hydrogen, water vapor may be supplied from a suitable source to the system through valve 5 and subjected to glow or other electrical discharges to produce substantial amounts of atomic hydrogen. When water vapor is used, it is introduced into the system at a pressure of the order of 0.01 to 0.1 mm. Hg. In such case we generally employ electrodes in chamber 6 and apply a suitable potential, which may be of the order of 1000 volts, for a period of about one to ten seconds. But a supplemental filament may be employed to reduce the breakdown voltage to advantage; or the incandescence of the filament alone may be relied upon to dissociate the water vapor. In other respects, the procedure is the same as in the first instance.

When water vapor is thus used, it may be desirable to dilute it with hydrogen, helium, argon, or other similar gas for the purpose of controlling the pressure and the breakdown potential of the mixture.

Figure 4:
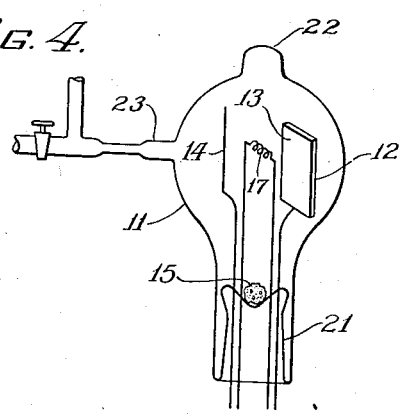
Fig. 4 is a schematic drawing showing an improved type of phototube constructed according to our invention.

The sensitizing and stabilizing operations may be simplified by so constructing the phototube as to include certain essential elements, as shown in Fig. 4. In the support 21 are sealed four leads supporting the members 14, 12 and 17. In the upper part of this support 21 a cavity is provided to receive a lump of alkali metal 15 introduced through tube 22 for sublimation to form alkali surface 13 of cathode 12. Anode 14 and cathode 12 with alkali surface 13 are of usual form and material. The filament 17 is electrically heated to activate and dissociate the molecular hydrogen or other gas which is introduced through the tube 23 and also to provide a source of electrons. Additional filaments may be provided for either purpose. In other respects the operations may be carried on substantially as when the arrangements of Fig. 1 and Fig. 3 are employed. Except when water vapor is used anode 14 may be dispensed with as cathode 12 serves as an anode when the heated filament 17 is used as a source of electrons, and the filament 17 will serve as an anode in the finished tube.

Instead of employing a structurally complete phototube, we may use a phototube in which alkali metal has not yet been applied to the surface of the cathode, or if applied, insufficiently. In such case, we have obtained good results by first applying a thin layer of alkali metal to the proper surface of the cathode, then sensitizing, and then stabilizing, and repeating the three steps until sufficient sensitivity has been attained. The application of the alkali metal to the surface of the cathode and the sensitizing and stabilizing operations may, however, be carried on simultaneously, in which case the metal particles are sensitized to some extent before they are deposited and while they are yet in the vapor phase; or in any desired sequence or combination of steps, with satisfactory results.

Having thus disclosed our invention, we claim:

1. The method of sensitizing a photosensitive surface consisting of subjecting a mixture of water vapor and a neutral gas to glow discharges at a suitable potential until the mixture is converted largely into atomic hydrogen and bombarding that surface with the resulting gases.

2. The method of rendering an electrode having a surface of alkali metal in a phototube photosensitive, consisting of dissociating water vapor until a spectroscopic analysis thereof discloses a substantial predominance of Balmer lines, introducing the resulting gas into the said tube, and bombarding the surface of the electrode thermionically.

3. The method of photosensitizing an electrode having a surface of alkali metal, in a phototube, consisting of subjecting water vapor in said tube to a suitable potential until a spectroscopic analysis thereof discloses a substantial predominance of Balmer lines.

4. The method of rendering an electrode having a surface of alkali metal in a phototube photosensitive, consisting of dissociating water vapor until a spectroscopic analysis thereof shows a substantial predominance of Balmer lines, introducing the resulting gas into the said tube and bombarding the surface of said electrode therewith.

5. The method of rendering an electrode in a phototube photosensitive, consisting of subjecting water vapor to a suitable potential in a closed chamber until a spectroscopic analysis thereof discloses a substantial predominance of Balmer lines, and depositing alkali metal upon the surface of said electrode in the presence of the resulting gases.

6. A cathode comprising a deposit of alkali metal upon a surface of supporting material and having thereon a layer consisting of alkali metal combined with gases of dissociated water vapor.

7. A cathode comprising a deposit of alkali metal upon a surface of suitable material and having thereon an electronized layer consisting of alkali metal combined with gases of dissociated water vapor.

8. The method of rendering an electrode having a surface of alkali metal in a phototube photosensitive, consisting of dissociating water vapor by means of an incandescent filament to produce a substantial amount of atomic hydrogen, and bombarding the surface of the electrode therewith.

JOSEPH TYKOCINSKI TYKOCINER.
LLOYD PRESTON GARNER.
ANNA KUNZ,
*Executrix of the Last Will and Testament of Jakob Kunz, Deceased.*